(12) United States Patent
Michan

(10) Patent No.: US 11,123,689 B2
(45) Date of Patent: Sep. 21, 2021

(54) APPARATUS AND METHOD FOR ELECTRON IRRADIATION SCRUBBING

(71) Applicant: DAPHNE TECHNOLOGY SA, Saint-Sulpice (CH)

(72) Inventor: Juan Mario Michan, Cambridge (GB)

(73) Assignee: Daphne Technology SA, Ecublens VD (CH)

( * ) Notice: Subject to any disclaimer, the term of this patent is extended or adjusted under 35 U.S.C. 154(b) by 119 days.

(21) Appl. No.: 15/764,528

(22) PCT Filed: Oct. 3, 2016

(86) PCT No.: PCT/GB2016/053075
§ 371 (c)(1),
(2) Date: Mar. 29, 2018

(87) PCT Pub. No.: WO2017/055881
PCT Pub. Date: Apr. 6, 2017

(65) Prior Publication Data
US 2019/0054418 A1    Feb. 21, 2019

(30) Foreign Application Priority Data
Oct. 2, 2015    (GB) ..................................... 1517477

(51) Int. Cl.
*B01D 53/32* (2006.01)
*B01J 19/08* (2006.01)
(Continued)

(52) U.S. Cl.
CPC ........... *B01D 53/323* (2013.01); *B01D 53/60* (2013.01); *B01D 53/92* (2013.01); *B01J 19/081* (2013.01);
(Continued)

(58) Field of Classification Search
CPC ...... B01D 53/323; B01D 53/60; B01D 53/92; B01D 2259/812; B01D 2258/0283;
(Continued)

(56) References Cited

U.S. PATENT DOCUMENTS 4,952,231 A * 8/1990 Kaneko ................. B01J 19/085
                                                        204/157.3
6,863,857 B2   3/2005 Luzzi et al.
(Continued)

FOREIGN PATENT DOCUMENTS

CN        1332029 A     1/2002
CN      101048228 A    10/2007
(Continued)

OTHER PUBLICATIONS

Translation of JP2008200057 (Year: 2008).*
(Continued)

*Primary Examiner* — Nicholas A Smith
(74) *Attorney, Agent, or Firm* — Myers Bigel, P.A.

(57) ABSTRACT

The present disclosure relates to methods of scrubbing of gas by exposure to electrons and apparatuses therefor. Such methods and apparatuses could be used to reduce harmful emissions created by the burning of fossil fuels, e.g. to power ships. According to one aspect there is provided apparatus for electron irradiation scrubbing, said apparatus comprising: an anode; a cathode a nanostructure located between said anode and said cathode, said nanostructure being configured to field-emit electrons in response to the presence of an electric field between the anode and cathode when a potential difference is established therebetween; and a housing coupled to said nanostructure and configured for locating the nanostructure so that it extends into a container containing gas to be scrubbed such that an interior of said container can be exposed to said electrons. According to
(Continued)

further aspects there are provided systems comprising such apparatus and methods making use of it.

20 Claims, 6 Drawing Sheets

(51) Int. Cl.
  *B01D 53/92* (2006.01)
  *B01D 53/60* (2006.01)
  *F01N 3/08* (2006.01)
  *F01N 13/00* (2010.01)
(52) U.S. Cl.
  CPC .... *F01N 3/0892* (2013.01); *B01D 2251/2062* (2013.01); *B01D 2257/302* (2013.01); *B01D 2257/404* (2013.01); *B01D 2258/01* (2013.01); *B01D 2258/0283* (2013.01); *B01D 2259/4566* (2013.01); *B01D 2259/812* (2013.01); *F01N 13/004* (2013.01); *F01N 2240/04* (2013.01); *F01N 2590/02* (2013.01); *Y02A 50/20* (2018.01)
(58) Field of Classification Search
  CPC ......... B01D 2258/01; B01D 2257/404; B01D 2257/302; B01D 2251/2062; B01D 2259/4566; B01D 53/32; B01D 53/007; B01J 19/081; F01N 3/0892; F01N 13/004; F01N 2590/02; F01N 2240/04; Y02A 50/2344; Y02A 50/20
  USPC ............................. 204/157.44; 422/186–187
  See application file for complete search history.

(56) References Cited

U.S. PATENT DOCUMENTS

| | | | | |
|---|---|---|---|---|
| 7,706,506 | B1* | 4/2010 | Woodruff | G21K 1/10 378/121 |
| 2003/0136660 | A1* | 7/2003 | Gnade et al. | B01J 19/08 588/204 |
| 2004/0150312 | A1* | 8/2004 | McElrath | H01J 1/3048 313/310 |
| 2005/0282458 | A1 | 12/2005 | Takeda et al. | |
| 2006/0057388 | A1 | 3/2006 | Jin et al. | |
| 2006/0251543 | A1* | 11/2006 | Koratkar | B82Y 15/00 422/98 |
| 2011/0163296 | A1* | 7/2011 | Pace | B82Y 15/00 257/24 |
| 2012/0164375 | A1* | 6/2012 | Jiang | H01J 9/025 428/119 |
| 2015/0022076 | A1* | 1/2015 | Ulisse | H01J 19/24 313/308 |
| 2015/0035428 | A1 | 2/2015 | Sun et al. | |
| 2017/0236677 | A1* | 8/2017 | Tiren | B03C 3/08 96/74 |

FOREIGN PATENT DOCUMENTS

| | | |
|---|---|---|
| EP | 1251543 | 10/2002 |
| JP | 2008200057 | 9/2008 |
| JP | 20100194448 | 9/2010 |
| JP | 2011218293 | 11/2011 |
| JP | 5499489 | 5/2014 |
| WO | 2006060103 A2 | 6/2006 |
| WO | WO 2007/061945 | 5/2007 |
| WO | WO 2015/118177 | 8/2015 |

OTHER PUBLICATIONS

Second Office Action issued in corresponding Chinese Application No. 201680059356X, dated Feb. 26, 2021 (including English translation).

Search Report issued in corresponding Chinese Application No. 201680059356X, dated Feb. 18, 2021.

* cited by examiner

APPARATUS AND METHOD FOR ELECTRON IRRADIATION SCRUBBING

STATEMENT OF PRIORITY

This application is a 35 U.S.C. § 371 national phase application of International Application Serial No. PCT/GB2016/053075, Filed Oct. 3, 2016, which claims the benefit, under 35 U.S.C. § 119(a) of Great Britain Patent Application No. 1517477.4, flied Oct. 2, 2015, the entire contents of each of which are incorporated by reference herein.

The present disclosure relates to methods of scrubbing of gas by exposure to electrons and apparatuses therefor. It can find particular application in, for example, the scrubbing of flue gases. Such methods and apparatuses could for example be used to reduce harmful emissions created by the burning of fossil fuels, e.g. to power ships.

There are increasing requirements for reduced and "cleaner", i.e. less harmful, emissions from use of fossil fuels and other processes. It is desirable to reduce the emission of pollutants which can contribute to climate change and/or damage the environment in other ways e.g. by harm to human, animal or plant health and/or damage to natural or manmade structures such as through creating acid rain.

Governments and intergovernmental organisations are accordingly implementing legal limits on emissions of certain pollutants. For example, In October 2008 the International Maritime Organization (IMO) (a United Nations agency in charge of maritime safety and security and prevention of marine pollution) adopted new standards to control exhaust emissions from ships. The new programme requires ships to control emissions to global standard limits on sulphur oxides and nitrogen oxides at all times in international waters. In addition, there are also sulphur emission control areas (SECA or ECA) within approximately 200 nautical miles of land in which ships are required to comply with more stringent limits. The United States of America and Canada submitted a joint application for an ECA along all their coastlines, which was accepted in March 2010. There are also ECAs in the Baltic Sea and the European Union is expected to follow, designating more ECAs. The new regulations require ships to reduce the emission of sulphur oxides by 85% and nitrogen oxides by 80% by 2015 in the ECAs and by 2020 (or 2025 subject to a revision) internationally and at all times at sea.

The currently favoured solution to meet these regulations is a combination of selective catalytic reduction ('scrubber') technology to reduce nitrogen oxides and switching to low sulphur content fuel to reduce sulphur oxides. This solution requires some modifications (structural and in the engine) of current ships, which are generally designed to run efficiently with high sulphur content fuel (the most cost efficient fuel available). Scrubber technologies also often involve the use of catalysts, which can be expensive and requires replacement of catalyst when used.

The most commonly used scrubber technology on ships involves showering scrubbing liquid over exhaust gases in a scrubbing tower or chimney. The scrubbing liquid is generally a blend of fresh water with caustic soda. However, fresh water storage on ships (in particular cruise ships) is often limited and much needs to be reserved for drinking and washing of the crew, passengers and galley equipment. On-board desalination is often not feasible due to the cost and amount of space taken up by the equipment. Further, once used the scrubbing liquid must either be stored for treatment in an effluent plant on land, or emulsion breaking equipment must be held on board to treat the scrubbing liquid so that it is not harmful to sea life when discharged overboard. There is generally limited space on board for either storage tanks or emulsion breaking equipment.

A catalyst-free scrubber technology used for treatment of flue emissions from fossil fuel burning facilities (e.g. power stations) and from municipal solid waste burning incinerators is electron beam flue gas treatment (EBFGT). EBFGT removes sulphur oxides and nitrogen oxides from stack gases at low energy cost by conversion to non-noxious ammonium sulphate-nitrate, usable as an agricultural fertiliser. This technique involves humidified flue gases passing through an electron beam reactor where high energy electrons bombard water and oxygen to create strong reagents that react with the sulphur oxides and nitrogen oxides to form sulphuric and nitric acids. These react with injected ammonia gas to form sulphate and nitrate salts of ammonia.

The electron beam reactor is formed by a bank of electron beam accelerators, specifically double-grid tetrode electrode guns in which the cathode housing is contained in a vacuum housing. Free electrons are produced in an ultra-clean environment (referred to as ultra-high vacuum) where the pressure is 12 orders of magnitude lower than atmospheric pressure. The electrons are then accelerated and sent through an aluminium or titanium membrane that separates the ultra-high vacuum environment from the flue stack were the pollutant gases are flowing. The electrons that get through the aluminium membrane collide with the gas molecules and start a chemical chain reaction which reduces the pollutants.

However, only a very low proportion of the electrons (around 1 in 19,000,000) make it through the metal membrane so the process is inefficient. In addition, implementations of such EBFGT systems require very large capital costs due to the electron accelerator installation. The electron accelerators also require frequent maintenance. Further, multiple accelerators have to be implemented for redundancy purposes. The need for an ultra-high vacuum in particular adds expense and can contribute to accelerator failures. EBFGT technology has not been used on board ships due to the complexity of the electron accelerator equipment.

According to a first aspect, there is provided an apparatus for electron irradiation scrubbing, said apparatus comprising: an anode; a cathode; a nanostructure located between said anode and said cathode, said nanostructure being configured to field-emit electrons in response to the presence of an electric field between the anode and cathode when a potential difference is established therebetween; and a housing coupled to said nanostructure and configured for locating the nanostructure so that it extends into a container containing gas to be scrubbed such that an interior of said container can be exposed to said electrons.

The nanostructure could have an aspect ratio of at least 1000, optionally at least 5000, optionally at least 10,000.

The nanostructure could be a carbon, silicon or titanium oxide nanowire, nanotube or nanohorn. The nanostructure could be a carbon nanotube (CNT).

Said nanostructure could be a multi walled CNT (MWNT) or metallic single walled CNT (metallic SWNT).

The nanostructure could be electrically connected to the cathode.

The apparatus could further comprise an additional electron source configured to impinge free electrons onto the CNT to induce stimulated electron field-emission therefrom. Said additional electron source could be another nanostructure.

The apparatus could further comprise an electrical power supply connection operatively coupled to the nanostructure. Said connection could be configured to provide a voltage pulse to the nanostructure.

The apparatus could comprise an array of nanostructures located between the anode and the cathode and electrically connected to the cathode, of which said nanostructure is one, said array being configured to field-emit electrons in response to the presence of an electric field between the anode and cathode when a potential difference is established therebetween. The array could consist of: multi walled CNTs (MWNTs); and/or single walled CNTs (SWNTs). The array could comprise more metallic SWNTs than semiconducting SWNTs. Adjacent nanostructures of the array could be separated by a distance less than or equal to 400 nm. The apparatus could further comprise a substrate on which the array is formed. Said substrate could be electrically conductive. Said substrate could be comprised in or electrically connected to the cathode. Said substrate could comprise one or both of silicon and a metal. Said silicon could be highly doped conductive silicon. Said silicon could be coated with aluminium at least on a side on which said array is formed. Said metal could comprise titanium, and/or a titanium alloy, and/or aluminium, and/or an aluminium alloy and/or copper, and/or a copper alloy. Said metal could be polished.

The apparatus could further comprise a heating element arranged to heat the nanostructure. Said heating element could be arranged in thermal contact with a side of said substrate reverse to that on which the array is present such that the heating element can conduct heat through the substrate to the array.

The apparatus could further comprise a current controlled power supply configured to heat said substrate by ohmic heating. Said current controlled power supply could be grounded by the cathode. The apparatus could further comprise a voltage controlled power supply configured to provide said voltage pulse to said connection. Said voltage controlled power supply could be: electrically connected between the connection and the anode; and grounded by the cathode.

The nanostructure could be at least partially coated in a material having a work function of less than 4 eV. Said material could comprise caesium or hafnium. The coating material could have a melting point of at least 400° C.

The nanostructure could be at least partially coated in a catalytic coating. Said catalytic coating could comprise one or more of vanadium oxide, zinc oxide and tungsten trioxide. Said catalytic coating could be applied over a stabilising coating such as titanium dioxide.

The array could comprise a combination of at least two of: one or more uncoated nanostructures, one or more nanostructures at least partially coated in a material having a work function of less than 4 eV, and one or more nanostructures at least partially coated in a catalytic coating.

The nanostructure could be hollow, its interior being at least partially filled with a stiffening material, the stiffening material optionally comprising a transition metal such as titanium, iron or copper. The stiffening material could comprise a material the substrate comprises, and optionally carbon. The substrate could comprise titanium and the stiffening material could comprise titanium carbide.

The nanostructure could be doped with an electron transport enhancing or electrical conductivity enhancing material.

According to a second aspect there is provided a system for electron irradiation scrubbing of flue gases, said system comprising multiple apparatuses according to any preceding claim, configured to be arranged concentrically, stacked or arrayed in a chimney cavity.

According to a third aspect there is provided a system for electron irradiation scrubbing of flue gases, said system comprising: at least four nanostructure arrays, each array formed on an electrically conductive substrate; an electrical power supply; electrical connections connecting said substrates, said power supply and ground in such a way that each substrate is at a different electrical potential; and one or more housings coupled to the substrates and configured for locating said arrays such that their nanostructures extend into the container containing gas to be scrubbed such that an interior of said container can be exposed to electrons field-emitted by the arrays; wherein the substrates are arranged such that, for all the substrates except that at the highest electrical potential, a straight line path exists from a surface of each array defined by free ends of nanostructures forming that array to a corresponding surface of the array formed on the substrate at the next highest potential. The substrates could be arranged in a double zigzag pattern.

According to a fourth aspect there is provided an electron irradiation scrubbing method comprising: establishing a potential difference between the anode and the cathode such that the nanostructure which is electrically connected to said cathode is exposed to an electric field, resulting in field-emission of electrons by said nanostructure; and exposing the gas to be scrubbed to said electrons.

The method could further comprise exposing the CNT to a free electron to induce stimulated electron field-emission from the CNT. Said free electron could be emitted from an additional electron source by field-emission or stimulated field-emission, said additional electron source being another nanostructure.

The method could further comprise providing a voltage pulse to the nanostructure. Said pulse could have a magnitude lower than a breakdown voltage of said gas.

Said nanostructure could be arranged to generate said electron beam in an environment at an absolute pressure of no less than 80 kPa.

Said voltage pulse could have an absolute amplitude of from 100 V to 5 kV. Said voltage pulse could have a duration of from 1 μs to 1 ms. Said voltage pulse could be repeated periodically. Said repetition could occur with a frequency of from 100 Hz to 500 kHz. Said pulse repetition could form a pulse train with a duty cycle of less than 50%.

The method could further comprise heating the nanostructure during said field-emission. The nanostructure could be heated to between 200 and 1000° C., optionally to between 300 and 900° C., optionally to between 400 and 800° C., optionally to between 400 and 600° C.

The method could further comprise: prior to exposing said gas to said electrons, mixing the gas with ammonia to form a gas mixture; and subsequent to exposing said gas mixture to the electrons, collecting a powder produced thereby.

Said gas could comprise emissions from a ship.

According to a fifth aspect there is provided a ship comprising the apparatus of the first aspect, or the system of the third aspect, wherein the container is configured to contain emissions from said ship.

Aspects of the present invention will now be described by way of example with reference to the accompanying figures (which are not drawn to scale). In the figures:

FIG. 1A is a flowchart of a scrubbing method;

FIG. 1B schematically illustrates the principle of an electron irradiation scrubbing technology;

FIG. 2 schematically illustrates an example larger scale arrangement shown in vertical cross-section;

Figure 3:
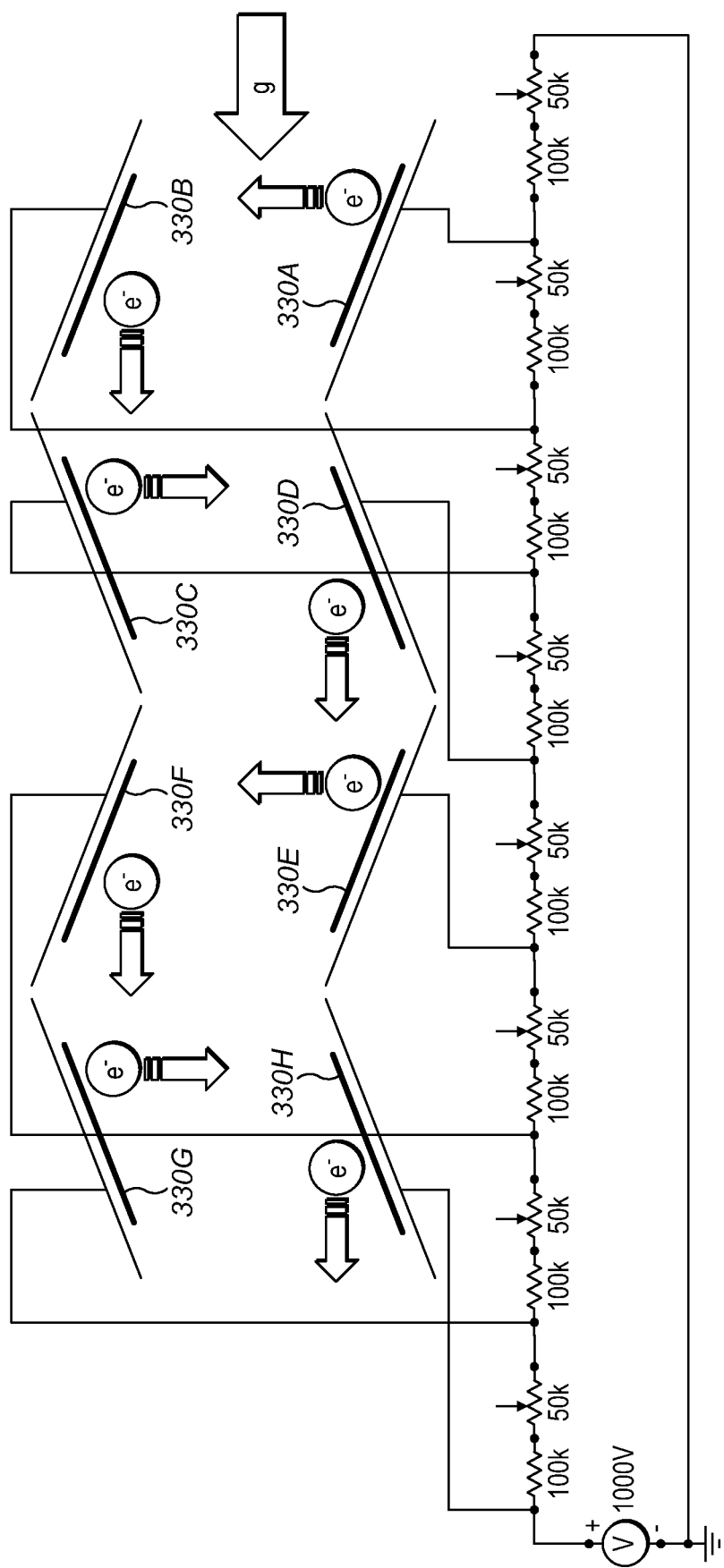
Figure 4A:
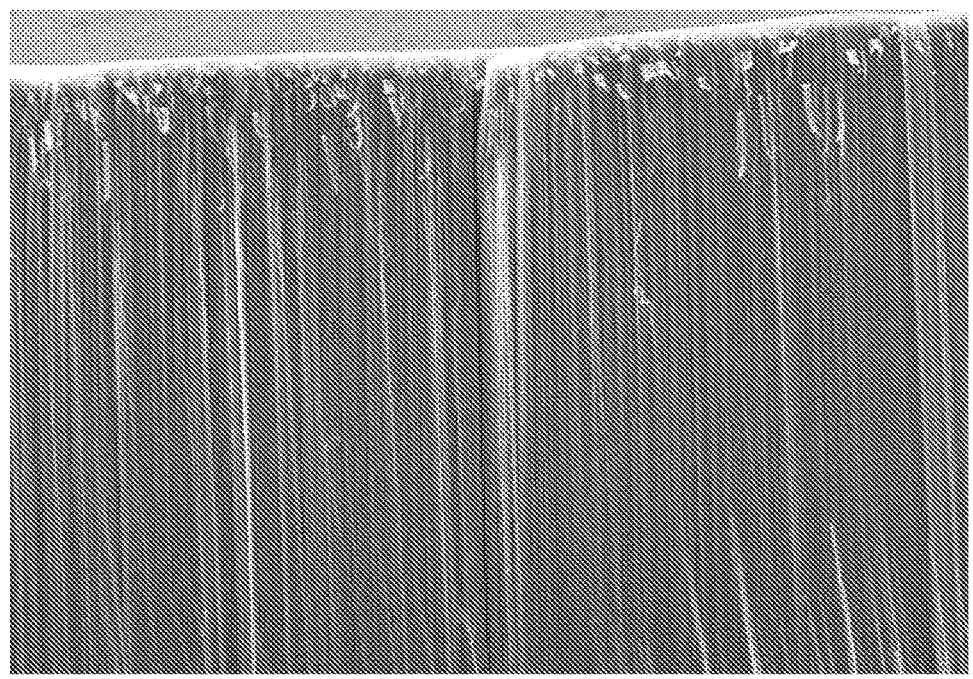
Figure 4B:
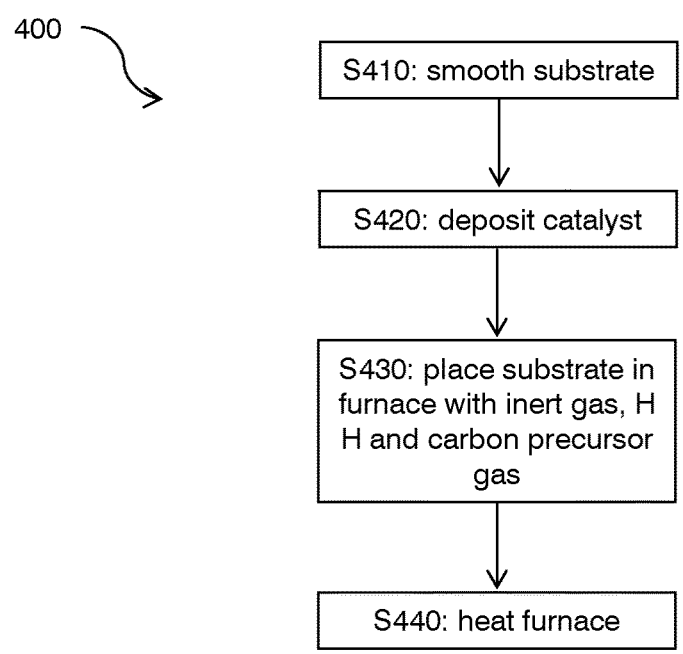
Figure 5:
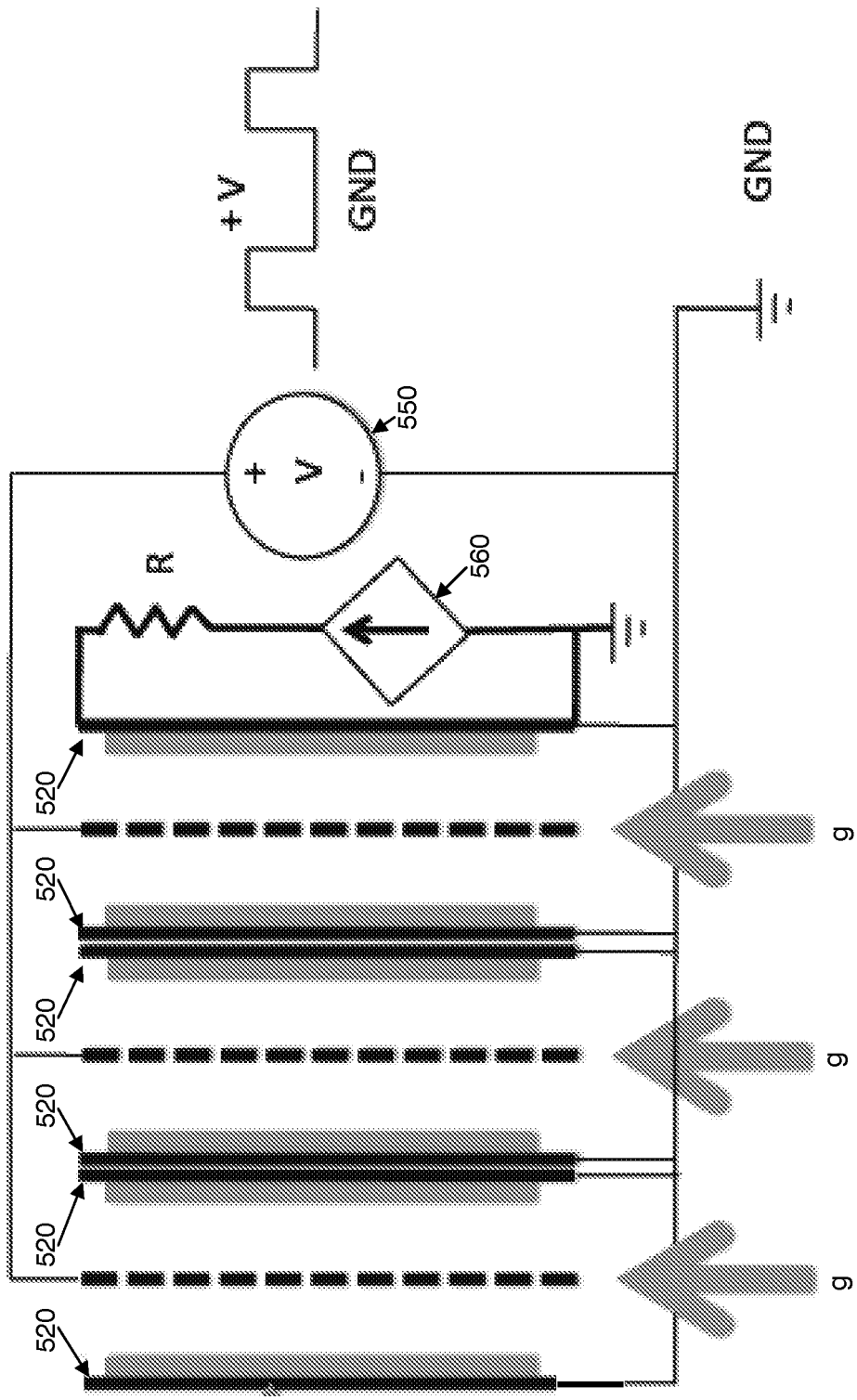

FIG. 3 schematically illustrates an example stepped potential arrangement;

FIG. 4A is a side-view of a CNT array taken with a scanning electron microscope;

FIG. 4B is a flowchart of an example CNT array fabrication method;

FIG. 5 schematically illustrates an example ohmic heating arrangement; and

Figure 6:
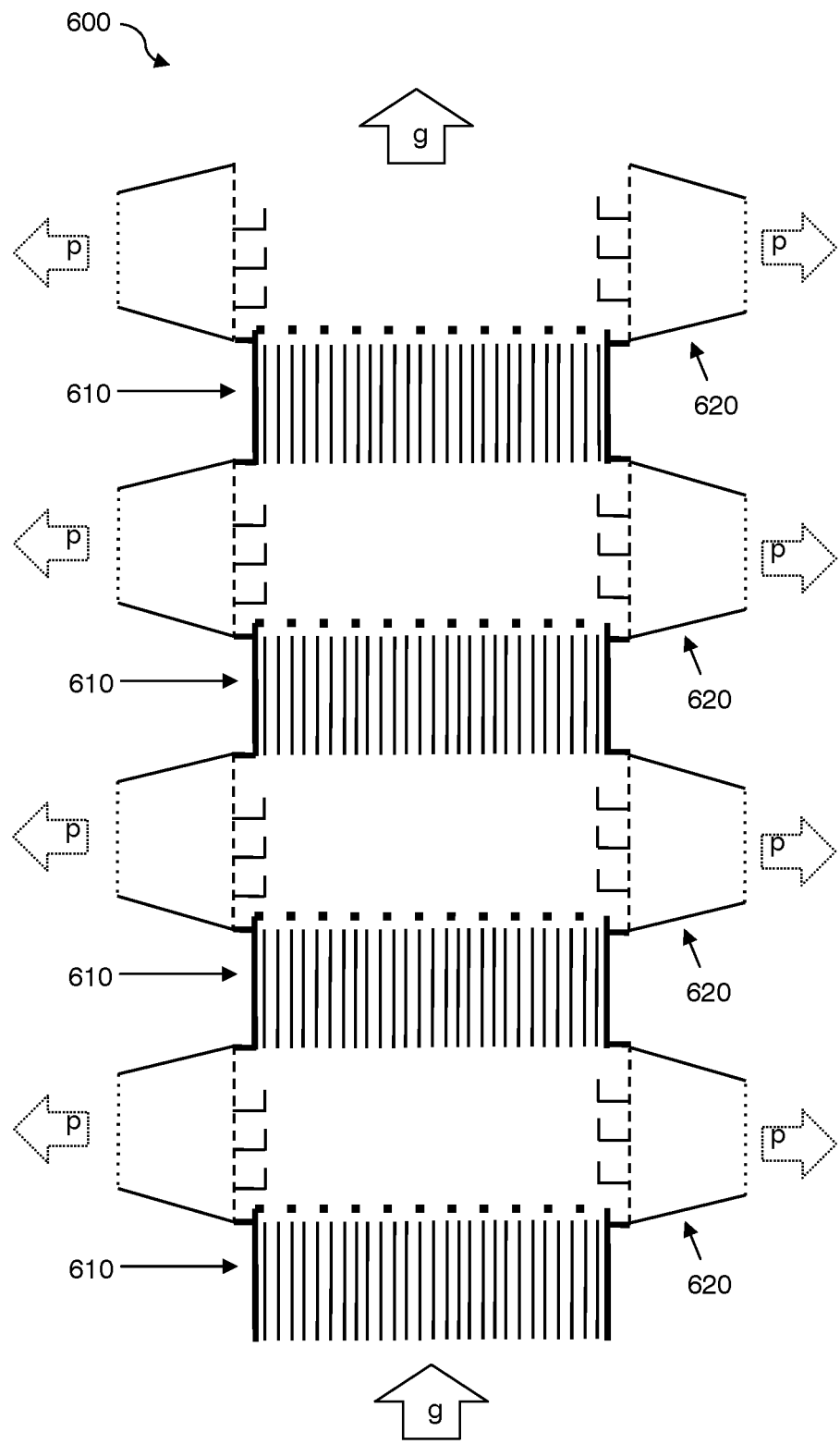

FIG. 6 illustrates example scrubbing apparatus.

The following description is presented to enable any person skilled in the art to make and use the system, and is provided in the context of a particular application. Various modifications to the disclosed embodiments will be readily apparent to those skilled in the art.

Carbon nanotubes (CNTs) have been found to be very good field-emitters of electrons when exposed to an electric field. The process of field-emission involves the application of large electric fields to the surface of a material. At sufficiently high electric field the vacuum barrier is reduced to the point that electrons can escape the surface of the material by quantum tunneling. CNTs can produce large numbers of electrons at relatively low applied voltages because of their very high aspect ratio (typically 50 to 200 nm diameter versus 1 to 2 mm length, i.e. 5000 to 40,000 aspect ratio) and their low work function (typically around 4 eV). The high aspect ratio causes a large field enhancement at the tips of the CNTs with several V/μm achievable at low applied voltages. The minimum electric field strength required for field-emission from a CNT is generally around 30 V/μm. This can be achieved by varying one or more of the length of the CNT, the diameter of the CNT, the distance between the anode and cathode used to create the electric field, and the applied voltage. If an array of CNTs is used the density of the array can also be varied to vary the electric field strength since CNTs tend to shield one another.

A technique, which will be referred to herein as stimulated electron filed-emission, has been developed to further increase the numbers of electrons emitted by CNTs. This technique involves stimulation of the CNTs by energetic electron impact. This process is similar to the process of secondary electron emission in bulk materials where an energetic electron impinging on the surface causes a large quantity of bound electrons close to the surface (up to approximately 10 nm from the surface) to escape the material.

Stimulated electron field-emission is greatly enhanced in arrays of CNTs (gains up to 19000 have been demonstrated), in part due to their large surface area and low density when compared with a bulk material such as a metal. An energetic electron travelling through a nanotube array travels a longer distance compared to an electron scattering through a bulk material due to the relatively low density of the array and the relatively large number of surfaces from which the electron can scatter. This deeper penetration leads to release of more electrons.

Electron field-emission and stimulated electron field-emission are very efficient processes in CNTs in vacuum, but become less efficient at higher pressures. For example, marine exhaust gases are typically at an absolute pressure of a little above atmospheric, e.g. 105 kPa, with fluctuations e.g. within a range of approximately 87 kPa to 140 kPa. This reduction in emission efficiency is perhaps due to the reduction of electric field caused by the high density of charged particles that forms in front of the free tips of the CNTs. A technique which can be used to maintain the instantaneous efficiency of electron production in nanotubes in high pressure environments (e.g. at around atmospheric pressure, for example 80 to 150 kPa) is to apply a series of voltage pulses to the CNTs.

It is proposed herein to use electrons emitted from one or more CNTs by field-emission to scrub gases such as flue emissions from combustion engines, e.g. in ships and other vehicles, power plants and incinerators. According to some aspects of the disclosure, one or more arrays of CNTs are provided for this purpose. Apparatus can be arranged, as described below, to cause emission of electrons from CNTs by field-emission and stimulated field-emission.

This catalyst-free scrubber technology can potentially reduce emissions of sulphur oxides by 99%, and emissions of nitrogen oxides by 85%, from the exhaust of new and retrofitted ship engines, exceeding the requirements of the regulations referred to above. Accordingly, ship operators would not need to switch to less cost-efficient low sulphur content fuel to adhere to the new regulations. This technology can also reduce other pollutants (as yet unregulated in the shipping industry) such as hydrogen chloride, hydrogen fluoride, volatile organic compounds and dioxins.

Figure 1A:
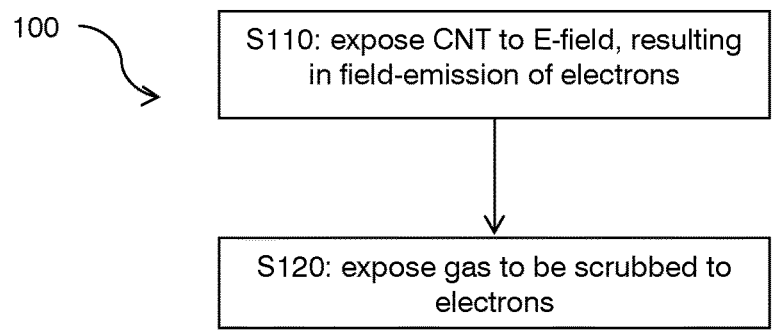

FIG. 1A is a flowchart of this scrubbing method 100. At S110, a CNT is exposed to an electric field, resulting in the field-emission of electrons from the CNT. At S120, gas to be scrubbed is exposed to those electrons.

Figure 1B:
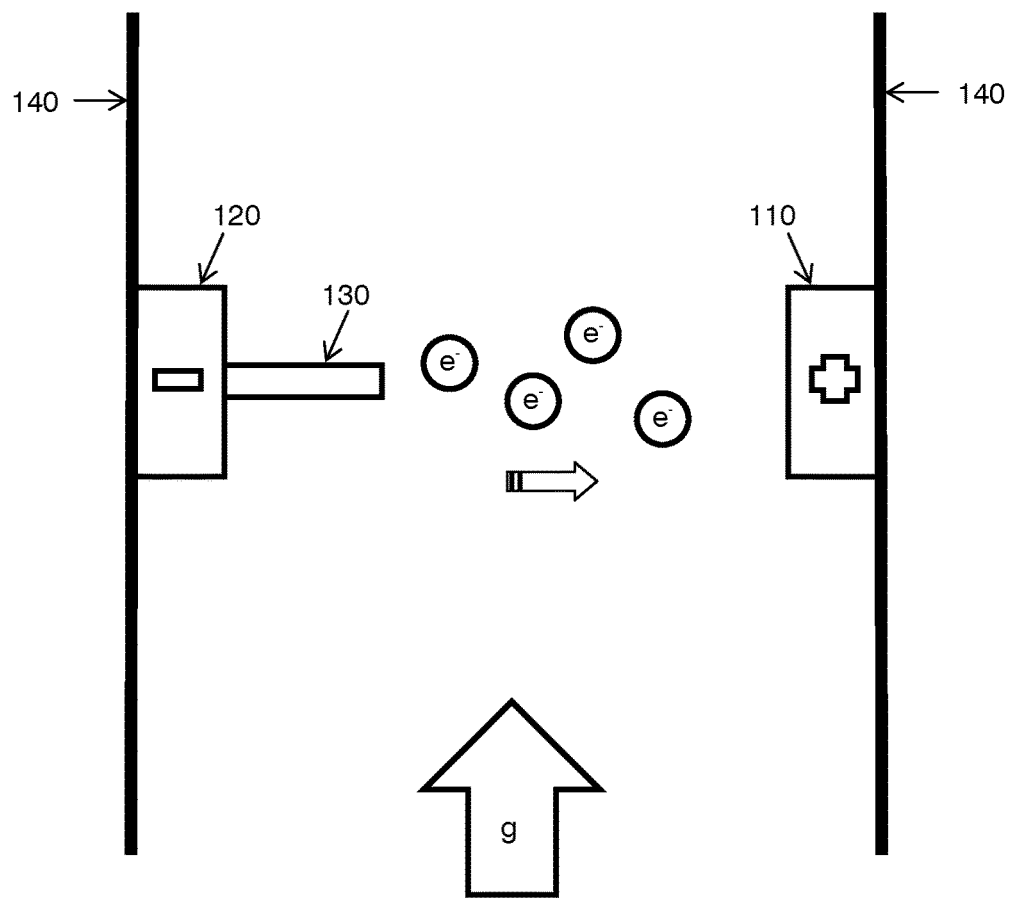

FIG. 1B schematically illustrates the principle of this electron irradiation scrubbing technology. An anode 110 is opposed to a cathode 120. A CNT 130 is located between the anode and the cathode, and may optionally be electrically connected to the cathode. The CNT field-emits electrons ($e^-$) in response to the presence of an electric field between the anode and cathode when a potential difference is established between them. The CNT is coupled to a housing of some sort in order to locate it in the vicinity of a container 140 containing gas (g) to be scrubbed such that an interior of the container can be exposed to the field-emitted electrons.

For a compact arrangement, the anode and/or cathode can be attached to the interior of the container (e.g. chimney) such that the CNT extends into the chimney and electrons traverse a cross-section of it. Many other arrangements could be envisaged however. For example, the CNT could be located outside of, but close to the container with a window (aperture) in the container side permitting electron access. Such an arrangement may for example be chosen to make retrofitting of the apparatus to an existing chimney easier, or for ease of maintenance of the CNT part of the apparatus. The cathode and housing need not be co-located.

The emission rate of the CNT can be improved by pulsing the voltage applied between the anode and cathode and/or by stimulating the CNT with energetic electron/ion bombardment.

Figure 2:
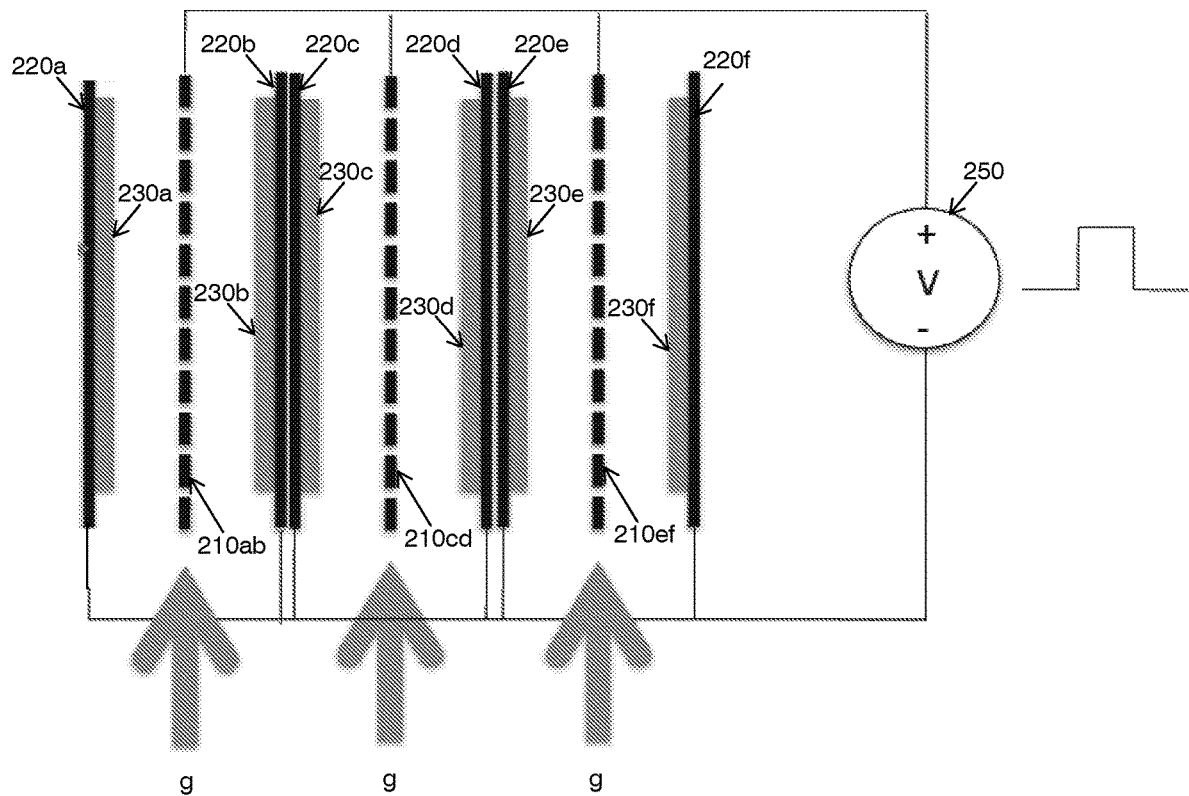
FIG. 2A shows a horizontal cross-section of an example arrangement according to FIG. 2.
FIG. 2B shows a horizontal cross-section of another example arrangement according to FIG. 2.
FIG. 2C shows a horizontal cross-section of an alternative example arrangement.

It may be more practical e.g. in an industrial setting to use arrays of CNTs rather than individual CNTs. It may also be preferable to provide multiple sets of anode-cathode-CNT apparatuses. FIG. 2 illustrates such a larger scale arrangement shown in cross-section through a chimney. Arrangements could also be envisaged wherein multiple sets of anode-cathode-single CNTs are used, or in which there is a single set of anode-cathode-CNT array. FIG. 2 shows 6 CNT arrays as an illustrative example, but other numbers of arrays could be used.

In FIG. 2, arrays 230 of CNTs are provided on conductive substrates 220 which act as cathodes opposed to anodes 210. The anodes are all electrically connected to the positive terminal of an electrical supply 250, while the cathodes are electrically connected to its negative terminal. Flue gas (g) rises up between the anodes and cathodes and is thus exposed to electrons field-emitted by the CNT arrays. The separation of each CNT array from its corresponding anode could for example be approximately 0.5 to 1 cm.

The rate of electron emission can be increased if electrical supply 250 is a voltage controlled supply operated to send a voltage pulse to the cathodes, with the cathodes being electrically connected to the CNTs. Such a voltage pulse could suitably have an absolute amplitude of from 100 V to 5 kV, for example 800 V works well for gas mixtures up to about one atmosphere absolute pressure. The pulse voltage should be below the breakdown voltage for the gas mixture (the voltage necessary to cause electric arc). This maximum voltage can be calculated using Paschen's Law for the specific gas mixture and pressure. The pulse could have a duration of from 1 µs to 1 ms, for example 200 µs. A series of voltage pulses could be employed. A periodic voltage pulse train could be used, for example with a frequency of from 100 Hz to 500 kHz, e.g. 1 kHz. Suitably, a duty cycle of less than 50% can be employed. Optimal pulse parameters depend on the geometry of the apparatus as well as gas velocity and composition.

Figure 2A:
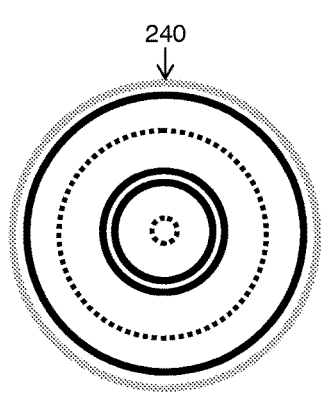
Figure 2B:
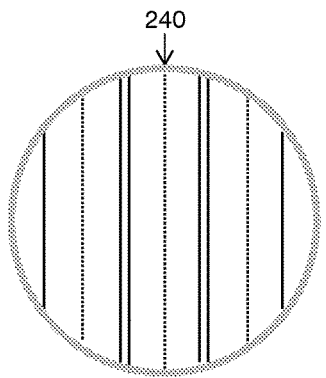

FIG. 2 shows a cross-section through a chimney which can correspond to two arrangements of anodes and cathodes as shown in FIGS. 2A and 2B, which respectively show horizontal cross-sections of the two arrangements as implemented in chimneys of circular cross-section. Similar apparatus could be used in chimneys having cross-sections of other shapes, for example square or rectangular. Apart from where otherwise indicated with reference numerals, in FIGS. 2A and 2B dotted lines indicate anodes and full lines indicate cathode-array arrangements.

According to the arrangement of FIG. 2A, within chimney 240 are concentrically arranged (from outside to inside) a cathode, an anode, a back-to-back pair of cathodes and a central anode.

According to the arrangement of FIG. 2B, within chimney 240 are arranged substantially flat plate (from left to right) cathode, anode, back-to-back cathode pair, anode, back-to-back cathode pair, anode, cathode. The plates could be of varying widths so as to extend all the way across the chimney as shown. This maximises the volume of gas passing between plates. Alternatively, the plates could all be substantially the same width for ease of manufacture.

Figure 2C:
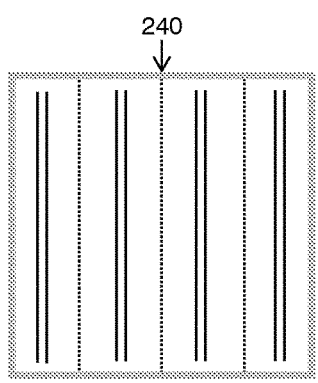

A slightly different arrangement is shown in FIG. 2C. In this case the container wall is conducting (e.g. metallic) and acts as an anode. For instance it could be in electrical contact with the anodes indicated by dotted lines. From left to right the electrodes are thus container wall anode, back-to-back cathode pair, anode, back-to-back cathode pair, anode, back-to-back cathode pair, anode, back-to-back cathode pair, container wall anode. The container walls, and optionally the other anodes, could all be grounded, with the cathodes held at a negative potential. A container of square cross-section is shown in this case, but the principle of using the container walls as electrodes could apply to other cross-section shapes.

Scaling the kinds of arrangements shown in FIGS. 2 to 2C up to sizes typical for a ship exhaust, a 1 m² cross-section chimney could for example have CNT array pairs repeated across the cross-section at a pitch of approximately 2 cm. The number of arrays needed would thus be of the order 100.

The arrangements shown in FIGS. 2, 2A and 2B all involve back-to-back cathode pairs. As shown in FIG. 2, each cathode of a pair could have a separate electrical connection to the voltage supply 250. A single electrical connection can be used to each pair if the cathodes of each pair are electrically connected to one another. Alternatively, in place of each back-to-back cathode pair a single cathode could be used with a CNT array located on both sides of it.

The anodes could be metallic meshes. If so, some electrons field-emitted by the leftmost array 230a as illustrated in FIG. 2 can pass through the anode 210ab and go on to cause stimulated field-emission in the next array 230b. This effect is enhanced if the potentials of the cathodes are stepped, i.e. the leftmost cathode 220a is at the lowest potential, the next cathode 220b is at a slightly higher potential (but still lower than the leftmost anode 210ab). Such potential stepping could be achieved using placement of appropriately rated resistors between electrodes (not shown).

Where anodes and cathodes are referred to herein, reference is made to two electrodes opposing one another across an air/gas gap with no other intervening electrodes, wherein the anode is defined as the electrode at the more positive potential of the two. Thus, although in this embodiment the second cathode 220b is at a higher potential than the leftmost cathode 220a, the second cathode 220b is still referred to as a cathode not an anode since the anode 210ab, at a higher potential than both cathodes 220a and 220b, separates the two cathodes.

As an example, the leftmost cathode 220a could be at −1.3 kV relative to the leftmost anode 210ab, which is grounded, and the next cathode 220b could be at −1.0 kV. An electron coming from the leftmost cathode 220a will have 1.3 keV of energy at the anode mesh 210ab and it only needs 1 keV to reach the next cathode 220b. When it hits that cathode 220b it can generate up to 19,000 electrons. This stepped pattern could be repeated across the three cathode-anode-cathode cells of the arrangement.

Alternatively to using meshed anodes, a stepped potential arrangement such as that shown in FIG. 3 could be used. The CNT arrays are arranged in a double zigzag configuration with each array being located on a substrate forming an electrode at a slightly higher potential than the last. This is achieved by the electrodes being connected in series, alternating with resistors. Array 330A field-emits electrons, some of which impinge on array 330B. Array 330B consequently emits electrons by stimulated field-emission, some of which impinge on array 330C and so on in alphabetical order all the way to array 330G as indicated by the arrows. (Some of the electrons emitted by each array will likely also impinge on other arrays than just the one with the next highest potential; the path taken by each free electron will depend on the electric field it travels through, generated by a combination of all the electrodes.)

Before passing through the anode-cathode-CNT apparatus, the gas may be pre-treated. For example it may pass through an electrostatic precipitator to remove particulate material. It may also be cooled, for example using a heat exchanger or by spraying or atomising cold water or another liquid or solution through it.

If ammonia is added to the gas before it is irradiated then breakup of any sulphur oxides or nitrogen oxides as a result of the electron irradiation leads to the formation of ammonium sulphate and ammonium nitrate salts respectively.

These salts can be used in fertilisers. An efficient way to collect them is to pass the irradiated gas through a wet precipitator, resulting in precipitation of a solution of ammonium sulphate nitrate, which is then used as the cooling spray for pre-treatment of the flue gas. The heat of the flue gas evaporates the water out of the salt solution, leaving the solid salts to drop into a particulate collector. Only a little water needs to be added to make up for stack losses; the rest is continuously recycled through the spray dryer-precipitator loop.

FIG. 4A is a side-view of a CNT array taken with a scanning electron microscope. The length of each CNT is approximately 2 mm. Such an array can be fabricated in a number of ways. A flowchart of one example method 400 is provided as FIG. 4B.

At S410 a substrate material is pre-processed to achieve sub-nanometer surface smoothness. For example, if silicon is used as a substrate, an aluminium buffer layer can be deposited on its surface. Such a buffer layer could be approximately 10 nm thick. Alternatively, if a metal substrate is used (e.g. titanium, aluminium, copper or alloys thereof), step S410 could comprise polishing the surface of the metal. This polishing could for example involve an electrolytic process. The substrate could for example be approximately 0.5 mm thick.

At S420 a catalyst is deposited on the substrate. The catalyst layer could be e.g. approximately 1 nm thick. The catalyst could for example be iron, nickel or cobalt. The catalyst could be deposited according to a predetermined pattern, e.g. using photolithography. Features of the pattern, e.g. the pitch and/or geometry of a grid, could depend on the makeup of the gas the array will be used to scrub. Suitably, the pitch of the pattern (which determines the spacing of the CNTs in the array) could be less than or equal to the mean free path of the gas, which could typically be up to around 400 nm.

At S430 the prepared substrate is placed in a furnace with a mixture of an inert gas, hydrogen and a carbon precursor gas (e.g. $C_2H_2$, $C_2H_4$, $CH_4$ or $C_4H_{10}$). For example, the furnace gases could consist of 600 sccm argon, 75 sccm ethylene and 600 sccm hydrogen.

At S440 the furnace is heated, resulting in decomposition of the precursor gas. Nucleation occurs on the catalyst to form nanoparticles from which the CNTs grow. The furnace could for example be heated to around 650 to 800° C.

The CNTs can be coated, either entirely or partially, e.g. on their free ends, with a low work function coating, for example caesium or hafnium, to improve the field-emission rate.

Alternatively or additionally, the CNTs could be doped with an electron transport enhancing or electrical conductivity enhancing material to improve the field emission efficiency. For example, doping with nitrogen causes metallic behaviour in semiconducting CNTs.

Fabrication of CNTs typically results in the production of a mixture of single walled CNTs (SWNTs), which tend to come in a mixture of metallic and semiconducting types, and multi walled CNTs (MWNTs). Since MWNTs and metallic SWNTs are better electrical conductors than semiconducting SWNTs, a fabrication process which favours a high percentage of either or both of the former types of CNTs relative to the latter is preferable. (Field-emission in semiconducting SWNTs follows the same physical process as metallic SWNTs but electrical conduction through the nanotube is not as efficient which can lead to charging and increase in the vacuum (or surface) barrier, reducing the field-emission efficiency. It may be possible however to improve the efficiency by further exciting the system by for example using a higher applied voltage and/or shining a laser on the CNTs.)

CNT arrays can become clogged with dust when left exposed. If the arrays are in direct contact with flue gases as illustrated they can also become clogged with any small particulates which are not successfully removed by the gas preconditioning. If ammonia is added as described above then ammonium sulphate nitrate salt particles can also coat the array surfaces (the particles being generally too large to penetrate the arrays to clog them). CNTs can also be damaged by discharges and shorts which can occur during operation due to ionisation of the gas. Damage to the CNTs can also occur due to collisions with accelerated ions. For all of these reasons, the field-emission performance of CNT arrays in high pressure environments (e.g. at around atmospheric pressure, for example 80 to 150 kPa) tends to decrease over time. All of these problems, which were not encountered for previous CNT emission systems with the CNTs in (near) vacuum, can be solved by heating the arrays, for example to around 600 to 800° C. for 1 to 3 hours in an inert gas. This anneals the CNTs, repairing broken bonds and recovering the original shape. Surface dust burns off and any adsorbed gases are desorbed. The arrays could be heated during use to further effect continuous annealing and to reduce the sticking coefficient to limit particulate deposits.

Such heating could be performed by a heating element affixed to the back of the array substrate. Alternatively, ohmic heating of the substrate itself could be employed. An example ohmic heating arrangement is schematically illustrated in FIG. 5. A current controlled power supply 560 is used to heat the substrates 520. The current controlled power supply and the voltage controlled power supply 550 could both be grounded through the substrates (cathodes).

If a low work function coating is employed, then a coating having a high melting point is preferred. For example, coatings having melting points above 400° C. would be suitable, e.g. coatings comprising hafnium, which has a melting point of 2231° C. This allows for CNT self-repair by heating as described above, and also ensures the coating remains intact even when exposed to hot exhaust gases.

Catalytic coatings could also be employed to reduce nitrogen oxides in the gas through the selective catalytic reduction (SCR) process. The nanotube array structure means that a large surface area of the catalytic coating is exposed to the gas, leading to efficient SCR. A system combining bare CNTs, and/or CNTs with a low work function coating, and/or CNTs with a catalytic coating could be used to achieve optimal performance by striking a balance between electron generation and SCR process efficiency.

Example catalytic coating materials include vanadium oxide ($V_2O_5$), zinc oxide (ZnO) and tungsten trioxide ($WO_3$). These materials can for example be coated directly onto the CNTs, or over a titanium dioxide ($TiO_2$) coating. Titanium dioxide is known to provide strong mechanical support and thermal stability to the catalysts. Other combinations of such catalysts could also be used. For example $V_2O_5$—$WO_3$/$TiO_2$. To implement this $TiO_2$ could first be evaporated onto the nanotubes and then $V_2O_5$ and $WO_3$ could be deposited.

The nanotubes could be filled fully or partially with a stiffening material to make them stiffer and/or so that they bond more strongly to the substrate surface. This makes them more resistant to damage. For example, a transition metal filler such as titanium, iron or copper could be used. Suitably, the filling material can be the substrate material and/or a combination of the substrate material and carbon (e.g. a carbide of the substrate material). Nanotubes bonded to a titanium substrate could be filled with titanium carbide to produce very well bonded nanotubes.

As an alternative to CNTs, or additionally for the same purpose, other types of nanostructure that field-emit electrons could be used, such as carbon nanohorns, silicon nanowires, titanium dioxide nanotubes or titanium dioxide nanowires. High aspect ratio nanostructures provide for more efficient field emission, for example nanostructures having an aspect ratio of at least 1000 could be used. An advantage of using nanowires is that large arrays of vertically aligned nanowires can be easily manufactured on an industrial scale. These examples do not field-emit as efficiently as CNTs, but their field-emission could be improved by coating with low work function materials as described above. Alternatively or additionally, the field emission could be made more efficient by doping with electron transport enhancing or electrical conductivity enhancing materials. For example, Group III (acceptor) or Group V (donor) atoms (e.g. phosphorous or boron) could be used in silicon nanostructures.

If titanium dioxide is used, either to form the nanostructures or to coat them, the temperature of the nanostructures (whether as a result of exposure to hot exhaust gas or deliberate heating for self-repair as described above) should be kept below 600° C. Above this temperature titanium dioxide changes from anatase structure to rutile.

FIG. 6 schematically illustrates an example arrangement 600 of the type of apparatus described above in a chimney. Stacks of CNT arrays 610 alternate with particle precipitator/collectors 620 along the path of the gas flow g. There could for example be four CNT array stacks alternating with four particle precipitator/collectors. Particles p are directed out of the chimney towards hoppers.

The CNT arrays could for example be formed on plates 1 m wide and 0.2 m high. They could be vertically separated by e.g. 0.3 m. In the quad-module example shown, the total height of the apparatus 600 would therefore be 2 m. Each CNT array stack 610 could for example comprise 50 CNT array pairs, e.g. arranged as shown in FIG. 2C with 49 back to back pairs, plus a single array at each of the left and right edges.

Other embodiments will be apparent to those skilled in the art from consideration of the specification and practice of the embodiments disclosed herein. It is intended that the specification and examples be considered as exemplary only.

In addition, where this application has listed the steps of a method or procedure in a specific order, it could be possible, or even expedient in certain circumstances, to change the order in which some steps are performed, and it is intended that the particular steps of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

Alternative Aspects (These are not Claims)
1. Apparatus for electron irradiation scrubbing, said apparatus comprising:
   an anode;
   a cathode;
   a carbon nanotube (CNT) located between said anode and said cathode, configured to field-emit electrons in response to the presence of an electric field between the anode and cathode when a potential difference is established therebetween; and
   a housing coupled to said CNT and configured for locating the CNT in the vicinity of a container containing gas to be scrubbed such that an interior of said container can be exposed to said electrons.
2. The apparatus of aspect 1, wherein the CNT is electrically connected to the cathode.
3. The apparatus of either of aspects 1 or 2, further comprising an additional electron source configured to impinge free electrons onto the CNT to induce stimulated electron field-emission therefrom.
4. The apparatus of aspect 3, wherein said additional electron source is a carbon nanotube.
5. The apparatus of any of aspects 1 to 4, further comprising an electrical power supply connection operatively coupled to the CNT and configured to provide a voltage pulse to the CNT.
6. The apparatus of any preceding aspect, wherein said CNT is a multi-walled CNT (MWNT) or metallic single walled CNT (metallic SWNT).
7. The apparatus of any preceding aspect, comprising an array of CNTs located between the anode and the cathode and electrically connected to the cathode, of which said CNT is one, said array being configured to field-emit electrons in response to the presence of an electric field between the anode and cathode when a potential difference is established therebetween.
8. The apparatus of aspect 7, wherein the array consists of:
   multi walled CNTs (MWNTs), and/or
   single walled CNTs (SWNTs), optionally wherein the array comprises more metallic SWNTs than semiconducting SWNTs.
9. The apparatus of either of aspects 7 or 8, wherein adjacent CNTs of the array are separated by a distance less than or equal to 400 nm.
10. The apparatus of any of aspects 7 to 9, further comprising a substrate on which the array is formed.
11. The apparatus of aspect 10, wherein said substrate is comprised in or electrically connected to the cathode.
12. The apparatus of either of aspects 10 or 11, wherein said substrate comprises one or both of silicon and a metal;
   said silicon optionally being highly doped conductive silicon, optionally coated with aluminium at least on a side on which said array is formed;
   said metal optionally comprising titanium and/or a titanium alloy and optionally being polished.
13. The apparatus of any preceding aspect, further comprising a heating element arranged to heat the CNT.
14. The apparatus of aspect 13 as dependent directly or indirectly on aspect 10, wherein said heating element is arranged in thermal contact with a reverse side of said substrate on which the array is not present such that the heating element can conduct heat through the substrate to the array.
15. The apparatus of aspect 10 or any of aspects 11 to 14 as dependent thereon, further comprising a current controlled power supply configured to heat said substrate by Ohmic heating.

16. The apparatus of aspect 15 as dependent directly or indirectly on aspect 11, as dependent indirectly on aspect 5, wherein said current controlled power supply is grounded by the cathode;
the apparatus further comprising a voltage controlled power supply configured to provide said voltage pulse to said connection, wherein said voltage controlled power supply is:
electrically connected between the connection and the anode; and
grounded by the cathode.
17. The apparatus of any preceding aspect, wherein the CNT is at least partially coated in a material having a work function of less than 4 eV, said material optionally comprising caesium or hafnium.
18. A system for electron irradiation scrubbing of flue gases, said system comprising multiple apparatuses according to any preceding aspect, configured to be arranged concentrically or stacked in a chimney cavity.
19. A system for electron irradiation scrubbing of flue gases, said system comprising:
at least four carbon nanotube (CNT) arrays, each array formed on an electrically conductive substrate;
an electrical power supply;
electrical connections connecting said substrates, said power supply and ground in such a way that each substrate is at a different electrical potential; and
one or more housings coupled to the substrates and configured for locating said arrays in the vicinity of a container containing gas to be scrubbed such that an interior of said container can be exposed to electrons field-emitted by the arrays;
wherein the substrates are arranged such that, for all the substrates except that at the highest electrical potential, a straight line path exists from a surface of each array defined by free ends of CNTs forming that array to a corresponding surface of the array formed on the substrate at the next highest potential.
20. The system of aspect 19, wherein the substrates are arranged in a double zigzag pattern.
21. An electron irradiation scrubbing method comprising:
establishing a potential difference between an anode and a cathode such that a carbon nanotube (CNT) located therebetween and electrically connected to said cathode is exposed to an electric field, resulting in field-emission of electrons by said CNT; and
exposing gas to be scrubbed to said electrons.
22. The method of aspect 21, further comprising exposing the CNT to a free electron to induce stimulated electron field-emission from the CNT.
23. The method of aspect 22, wherein said free electron was emitted from an additional electron source by field-emission or stimulated field-emission, said additional electron source being a carbon nanotube.
24. The method of any of aspects 21 to 23, further comprising providing a voltage pulse to the CNT, said pulse optionally having a magnitude lower than a breakdown voltage of said gas.
25. The method of any of aspects 21 to 24, wherein said CNT is arranged to generate said electron beam in an environment at a pressure of no less than 1 bar.
26. The method of aspect 24 or aspect 25 as dependent thereon, wherein said voltage pulse has:
a magnitude of from 100 V to 2 kV; and/or
a duration of from 50 µs to 1 ms.
27. The method of aspect 24 or either of aspects 25 or 26 as dependent thereon, wherein said voltage pulse is repeated periodically, optionally with a frequency of from 100 Hz to 1 kHz, optionally with a duty cycle of less than 50%.
28. The method of any of aspects 21 to 27, further comprising heating the CNT during said field-emission.
29. The method of aspect 28, wherein the CNT is heated to from 200 to 1000° C., optionally to from 300 to 900° C., optionally to from 400 to 800° C.
30. The method of any of aspects 21 to 29, further comprising:
prior to exposing said gas to said electrons, mixing the gas with ammonia to form a gas mixture; and
subsequent to exposing said gas mixture to the electrons, collecting a powder produced thereby.
31. The method of any of aspects 21 to 30, wherein said gas comprises emissions from a ship.
32. A ship comprising the apparatus of any of aspects 1 to 18, or the system of either of aspects 19 or 20, wherein said gas comprises emissions from said ship.
33. Apparatus substantially as herein described, with reference to the accompanying figures.
34. A method substantially as herein described with reference to the accompanying figures.
35. A ship substantially as herein described with reference to the accompanying figures.

The invention claimed is:
1. Apparatus for electron irradiation scrubbing, said apparatus comprising:
an anode;
a cathode;
a nanostructure located between said anode and said cathode, said nanostructure being electrically connected to the cathode and configured to field-emit electrons in response to the presence of an electric field between the anode and cathode when a potential difference is established therebetween, wherein the anode and cathode are arranged without an intervening electrode between the anode and cathode; and
a housing coupled to said nanostructure and configured for locating the nanostructure so that the nanostructure extends into a container containing gas to be scrubbed such that an interior of said container can be exposed to said electrons.
2. The apparatus of claim 1, wherein the nanostructure is a carbon nanotube (CNT), further comprising another nanostructure, acting as an additional electron source, configured to impinge free electrons onto the CNT to induce stimulated electron field-emission therefrom.
3. The apparatus of claim 1, further comprising an electrical power supply connection operatively coupled to the nanostructure and configured to provide a voltage pulse to the nanostructure.
4. The apparatus of claim 1, further comprising a heating element arranged to heat the nanostructure.
5. The apparatus of claim 1, further comprising an array of nanostructures located between the anode and the cathode, and the array comprises a combination of at least two of:
one or more uncoated nanostructures,
one or more nanostructures at least partially coated in a material having a work function of less than 4 eV, and
one or more nanostructures at least partially coated in a catalytic coating.
6. The apparatus of claim 1, wherein the nanostructure is hollow, its interior being at least partially filled with a stiffening material, the stiffening material optionally comprising a transition metal such as titanium, iron or copper.

7. The apparatus of claim 6, wherein the stiffening material comprises carbon.

8. The apparatus of claim 7, wherein the stiffening material further comprises titanium.

9. The apparatus of claim 1, wherein the nanostructure is doped with an electron transport enhancing material or electrical conductivity enhancing material.

10. A system for electron irradiation scrubbing of flue gases, said system comprising multiple apparatuses according to claim 1, configured to be arranged concentrically, stacked or arrayed in a chimney cavity.

11. A system for electron irradiation scrubbing of flue gases, said system comprising:
at least four nanostructure arrays, wherein at least one of the arrays comprises the nanostructure of claim 1, and wherein each array of the at least four nanostructure arrays is formed on an electrically conductive substrate;
an electrical power supply;
electrical connections connecting said substrates, said power supply and ground in such a way that each substrate is at a different electrical potential; and
one or more housings coupled to the substrates and configured for locating said arrays such that their nanostructures extend into the container containing gas to be scrubbed such that an interior of said container can be exposed to electrons field-emitted by the arrays;
wherein the substrates are arranged such that, for all the substrates except that at the highest electrical potential, a straight line path exists from a surface of each array defined by free ends of nanostructures forming that array to a corresponding surface of the array formed on the substrate at the next highest potential.

12. An electron irradiation scrubbing method to be performed with the apparatus of claim 1, the method comprising:
establishing a potential difference between the anode and the cathode without an intervening electrode between the anode and cathode such that the nanostructure, which is electrically connected to said cathode, is exposed to an electric field, resulting in field-emission of electrons by said nanostructure; and
exposing the gas to be scrubbed to said electrons.

13. The method of claim 12, further comprising exposing the CNT to a free electron to induce stimulated electron field-emission from the CNT, wherein said free electron was emitted from an additional electron source by field-emission or stimulated field-emission, said additional electron source being another nanostructure.

14. The method of claim 12, further comprising providing a voltage pulse to the nanostructure, said pulse optionally having a magnitude lower than a breakdown voltage of said gas.

15. The method of claim 12, wherein said nanostructure is arranged to generate said electron beam in an environment at an absolute pressure of no less than 80 kPa.

16. The method of claim 14, wherein said voltage pulse has:
an absolute amplitude of from 100 V to 5 kV; and/or
a duration of from 1 s to 1 ms.

17. The method of claim 14, wherein said voltage pulse is repeated periodically, optionally with a frequency of from 100 Hz to 500 kHz, optionally with a duty cycle of less than 50%.

18. The method of claim 12, further comprising heating the nanostructure during said field-emission.

19. The method of claim 12, further comprising:
prior to exposing said gas to said electrons, mixing the gas with ammonia to form a gas mixture; and
subsequent to exposing said gas mixture to the electrons, collecting a powder produced thereby.

20. An apparatus for electron irradiation scrubbing, said apparatus comprising:
an anode;
a cathode;
a nanostructure located between said anode and said cathode, said nanostructure being electrically connected to the cathode and configured to field-emit electrons in response to the presence of an electric field between the anode and cathode when a potential difference is established therebetween;
an electrical power supply connection operatively coupled to the nanostructure and configured to provide a voltage pulse to the nanostructure; and
a housing coupled to said nanostructure and configured for locating the nanostructure so that the nanostructure extends into a container containing gas to be scrubbed such that an interior of said container can be exposed to said electrons.

* * * * *

UNITED STATES PATENT AND TRADEMARK OFFICE
CERTIFICATE OF CORRECTION

PATENT NO. : 11,123,689 B2  
APPLICATION NO. : 15/764528  
DATED : September 21, 2021  
INVENTOR(S) : Juan Mario Michan Page 1 of 1

It is certified that error appears in the above-identified patent and that said Letters Patent is hereby corrected as shown below:

On the Title Page

Column 1, (30) Foreign Application Priority Data: Please correct "1517477" to read -- 1517477.4 --

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*